United States Patent
Ku et al.

(10) Patent No.: US 10,394,865 B2
(45) Date of Patent: Aug. 27, 2019

(54) TEXT-BASED CONTENT MANAGEMENT METHOD AND APPARATUS OF ELECTRONIC DEVICE

(71) Applicant: Samsung Electronics Co., Ltd., Suwon-si, Gyeonggi-do (KR)

(72) Inventors: Jaesung Ku, Suwon-si (KR); Hojun Jaygarl, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 14/974,494

(22) Filed: Dec. 18, 2015

(65) Prior Publication Data
US 2016/0179943 A1 Jun. 23, 2016

(30) Foreign Application Priority Data
Dec. 18, 2014 (KR) ........................ 10-2014-0183525

(51) Int. Cl.
*G06F 7/00* (2006.01)
*G06F 17/30* (2006.01)
(Continued)

(52) U.S. Cl.
CPC ............ *G06F 16/335* (2019.01); *G06F 16/38* (2019.01); *G06F 16/9535* (2019.01)

(58) Field of Classification Search
CPC .... G06F 16/335; G06F 16/38; G06F 16/9535; G06F 17/30; G06F 17/2795; G06F 17/248; G06F 17/2755
See application file for complete search history.

(56) References Cited

U.S. PATENT DOCUMENTS

| 8,244,706 B2* | 8/2012 | Christensen | ...... G06F 17/30864 707/706 |
| 8,850,486 B2 | 9/2014 | Newton et al. | |

(Continued)

FOREIGN PATENT DOCUMENTS

| EP | 2 806 620 A1 | 11/2014 |
| KR | 10-2011-0049031 A | 5/2011 |

(Continued)

OTHER PUBLICATIONS

European Office Action dated Dec. 6, 2018, issued in a counterpart European application No. 15200795.1-1231.

*Primary Examiner* — Azam M Cheema
(74) *Attorney, Agent, or Firm* — Jefferson IP Law, LLP

(57) ABSTRACT

A text-based content management method and apparatus of an electronic device are provided. The electronic device includes a communication unit configured to communicate with an external device, a display unit configured to display a message management screen comprising a text input window, and a control unit configured to detect at least one entity text among texts displayed on the text input window in response to characters input therein, control the display unit to display relevant information corresponding to the detected at least one entity text in response to a first input selecting the entity text, the selected at least one entity text being a search keyword for retrieving the relevant information, and generate a text-based content in which the retrieved relevant information is linked to the selected at least one entity text in response to a second input selecting the retrieved relevant information.

12 Claims, 12 Drawing Sheets

(51) Int. Cl.
  *G06F 16/335*    (2019.01)
  *G06F 16/38*     (2019.01)
  *G06F 16/9535*   (2019.01)

(56) References Cited

U.S. PATENT DOCUMENTS

| | | | |
|---|---|---|---|
| 9,449,080 B1* | 9/2016 | Zhang | G06F 17/30657 |
| 9,811,592 B1* | 11/2017 | Bakir | G06F 17/30864 |
| 2003/0105589 A1 | 6/2003 | Liu et al. | |
| 2008/0201434 A1 | 8/2008 | Holmes et al. | |
| 2010/0251086 A1 | 9/2010 | Haumont et al. | |
| 2011/0130123 A1 | 6/2011 | Myaeng et al. | |
| 2011/0191364 A1 | 8/2011 | Lebeau et al. | |
| 2012/0084308 A1 | 4/2012 | Kang | |
| 2012/0136893 A1 | 5/2012 | Moon et al. | |
| 2013/0325972 A1 | 12/2013 | Boston et al. | |
| 2014/0040277 A1 | 2/2014 | Asur et al. | |
| 2014/0280114 A1* | 9/2014 | Keysar | G06F 17/30864 |
| | | | 707/730 |
| 2014/0351350 A1 | 11/2014 | Lee et al. | |
| 2015/0127748 A1* | 5/2015 | Buryak | H04L 51/32 |
| | | | 709/206 |
| 2016/0034977 A1* | 2/2016 | Bhaowal | G06Q 30/0277 |
| | | | 707/722 |

FOREIGN PATENT DOCUMENTS

| | | |
|---|---|---|
| KR | 10-1038087 B1 | 5/2011 |
| KR | 10-2012-0076482 A | 7/2012 |
| KR | 10-1401250 B1 | 5/2014 |

* cited by examiner

FIG. 8
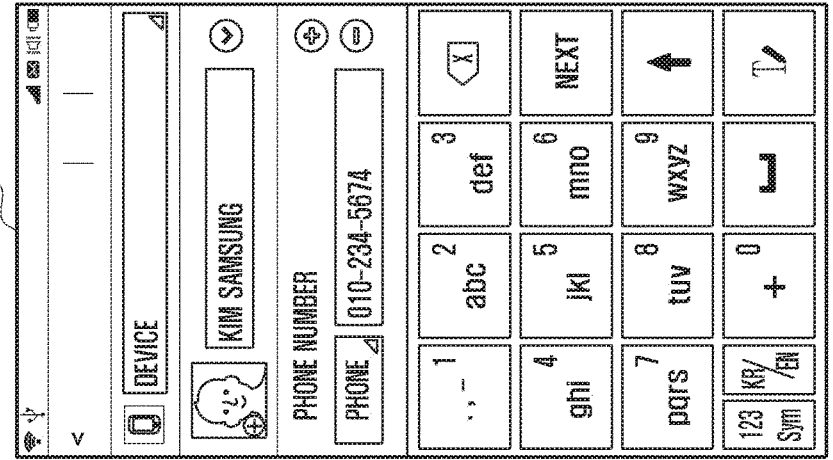
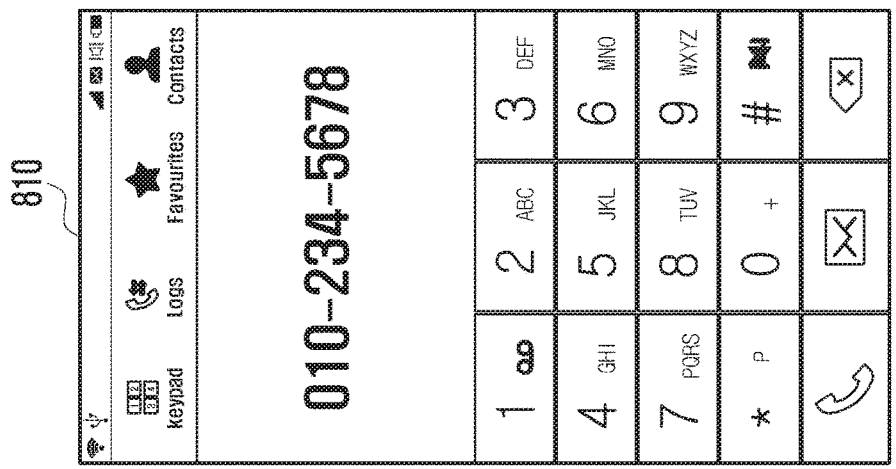

FIG. 9

TEXT-BASED CONTENT MANAGEMENT METHOD AND APPARATUS OF ELECTRONIC DEVICE

CROSS-REFERENCE TO RELATED APPLICATION(S)

This application claims the benefit under 35 U.S.C. § 119(a) of a Korean patent application filed on Dec. 18, 2014 in the Korean Intellectual Property Office and assigned Serial number 10-2014-0183525, the entire disclosure of which is hereby incorporated by reference.

TECHNICAL FIELD

The present disclosure relates to a text-based content management method and apparatus of an electronic device.

BACKGROUND

With the advance of hardware and communication technologies, electronic devices are used in various fields and provide users with various functionalities. The electronic devices allow users to communicate and exchange information, such as photos and contacts, with each other using a text messing feature.

In order to send a counterpart's electronic device information such as photos and contacts along with a text message, or to search for relevant information in text input mode, a user has to make extra input manipulation to retrieve specific information from the electronic device in addition to the text input manipulation. For example, in order to inform the counterpart a phone number, the user has to laboriously search the phonebook stored in the electronic device to find the contact containing that phone number and send the manually retrieved phone number to the counterpart. Also, in order to acquire information relevant to certain text while checking a schedule or memo, the user has to perform a series of burdensome manipulation tasks in a stepwise manner.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide.

Another aspect of the present disclosure is to provide a method and apparatus for recognizing meaningful entity in the text input by the user and adding or storing the relevant information related to the entity text are proposed for the text-based content management of an electronic device.

In accordance with another aspect of the present disclosure, a method and apparatus for providing relevant information related to a meaningful entity detected in the text are proposed for the text-based content management of an electronic device.

In accordance with another aspect of the present disclosure, an electronic device is provided. The electronic device includes a communication unit configured to communicate with an external device, a display unit configured to display a message management screen comprising a text input window, and a control unit configured to detect at least one entity text among texts displayed on the text input window in response to characters input therein, control the display unit to display relevant information corresponding to the detected at least one entity text in response to a first input selecting the at least one entity text, the selected at least one entity text being a search keyword for retrieving the relevant information, and generate a text-based content in which the retrieved relevant information is linked to the selected at least one entity text in response to a second input selecting the retrieved relevant information.

In accordance with another aspect of the present disclosure, a text-based content management method of an electronic device is provided. The method includes detecting an entity text among texts displayed on a text input window in response to characters input therein, displaying relevant information corresponding to the detected entity text in response to a first input selecting the entity text, the selected entity text being a search keyword for retrieving the relevant information, and generating a text-based content in which the retrieved relevant information is linked to the detected entity text in response to a second input selecting the retrieved relevant information.

In accordance with another aspect of the present disclosure, a text-based content management method of an electronic device is provided. The method includes displaying, when a text-based content includes an entity text linked to relevant information, the text-based content being distinguished from other texts, displaying the relevant information linked to the entity text in response to a first input selecting the entity text, and executing a function or application corresponding to the displayed relevant information in response to a second input selecting the displayed relevant information.

The text-based content management method and apparatus of the present disclosure is advantageous in that the device may analyze the text being input by a user to check for a meaningful or informative entity, retrieve relevant information related to the entity, and present the relevant information to the user automatically. This makes it possible for the user to add the relevant information to the text message, which is currently being written to a counterpart, without extra input manipulation.

Also, the text-based content management method and apparatus of the present disclosure is advantageous in that the electronic device may analyze the text input by the user in the text input mode and retrieve and recommend relevant information related to an entity as an analysis result automatically, and thus the user may link the entity recognized from the text to the relevant information and store the mapping between the entity and relevant information without extra input manipulation.

Also, the text-based content management method and apparatus of the present disclosure is advantageous in terms of improving user convenience and usability of the electronic device because the electronic device checks a meaningful entity in the text received from a counterpart or the text opened in a text display mode to retrieve relevant information related to the entity and execute a function related to the relevant information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a diagram illustrating other exemplary text-based content manipulation screen displays according to various embodiments of the present disclosure;

FIG. 9 is a diagram illustrating exemplary screen displays for explaining text-based content management method according to various embodiments of the present disclosure;

Throughout the drawings, it should be noted that like reference numbers are used to depict the same or similar elements, features, and structures.

DETAILED DESCRIPTION

Figure 1:
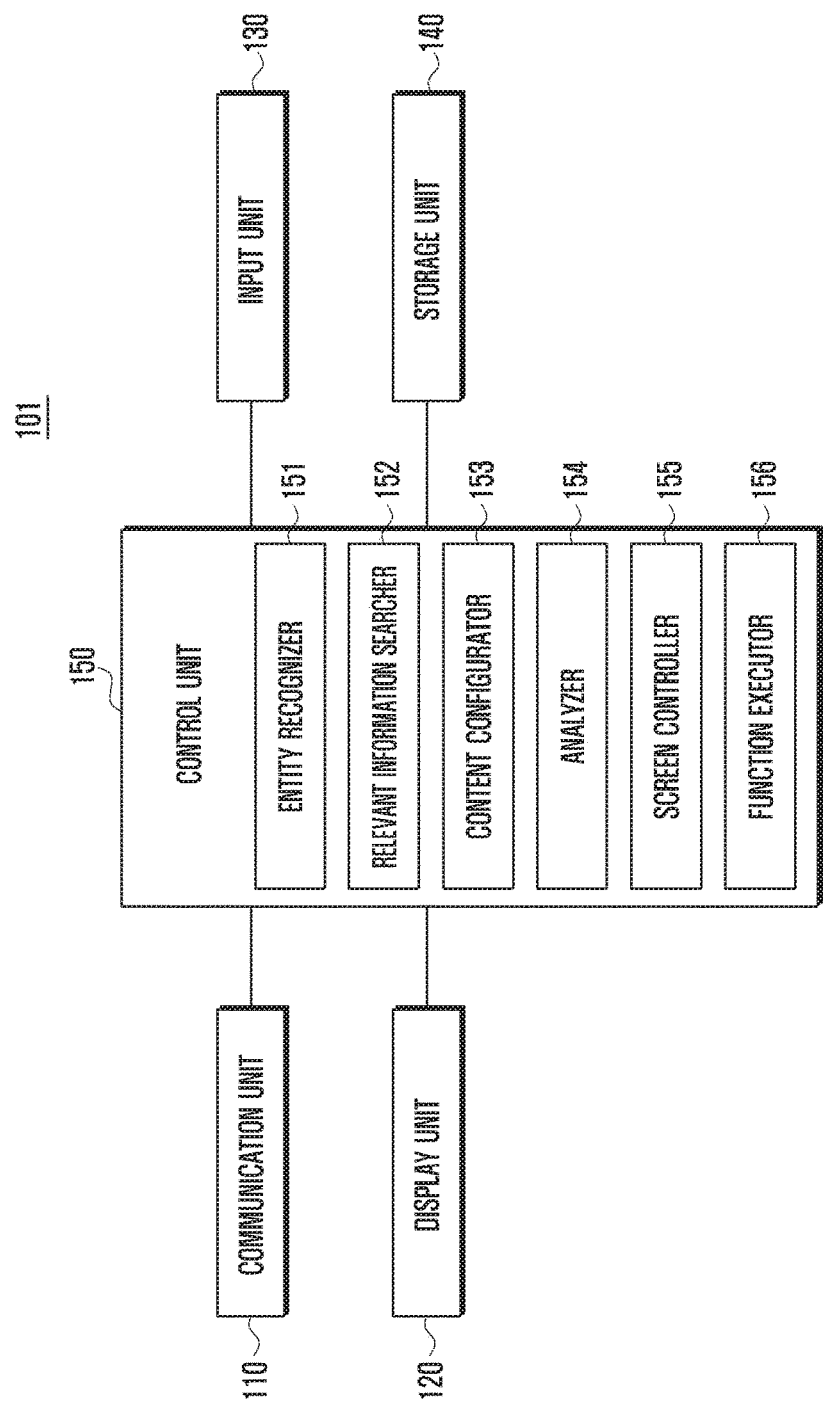
FIG. 1 is a block diagram illustrating a configuration of the electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate various embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a motion picture experts group (MPEG)-1 or MPEG-2 audio layer III (MP3) player, a portable medical device, a digital camera, or a wearable device (e.g., an head-mounted device (HMD) such as electronic glasses, electronic clothes, an electronic bracelet, an electronic necklace, an electronic accessory, or a smart watch).

FIG. 1 is a block diagram illustrating a configuration of the electronic device according to various embodiments of the present disclosure.

Referring to FIG. 1, the electronic device 101 includes a communication unit 110, a display unit 120, an input unit 130, a storage unit 140, and a control unit 150.

The communication unit 110 may perform voice, video, and data communications with an external device (e.g., another electronic device and a server) via a wireless/wired network under the control of the control unit 150. The wireless communication may be accomplished through one of Wi-Fi, Bluetooth™ (BT), near field communication (NFC), global positioning system (GPS), and cellular communication (e.g. long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM)). The wired communication may be accomplished through one of universal serial bus (USB), high definition multimedia interface (HDMI), recommended standard 232 (RS-232), and plain old telephone service (POTS).

The communication unit 110 may communicate text-based content with an external device. The text-based content may be handled by means of a texting function such as inputting, adding, and editing texts.

For example, the text-based contents may include all types of contents that can be generated through text input such as, for example, the content generated by adding a text to an image and adding text to compose any one of a message, email, memo, note, schedule, and document.

In an embodiment, the communication unit 110 may establish a messaging service channel for a text messaging function. The message service channel may be established to transmit/receive various message formats such as a short message, multimedia message, and instant message. The communication unit 110 may transmit/receive text-based contents using a message communication protocol and a text-based communication protocol.

The display unit 120 is responsible for displaying images or data to the user. The display unit 120 may include a display panel. The display panel may be implemented with a liquid crystal display (LCD) or active matrix organic light emitting diodes (AM-OLED). The display unit 120 may further include a controller for controlling the display panel. The display unit 120 and the touch panel may be integrated into a single module (e.g., a touchscreen).

The display unit 120 may display a text-based content management screen, text input screen, text display screen, text composition screen, message reception screen, and relevant information management screen. The display unit 120 may change the entity text corresponding to the retrieved relevant information or display the relevant information on the screen under the control of the control unit 150.

The input unit 130 may generate a key signal to the control unit 150, the key signal being related to user settings and function control of the electronic device 101. The input unit 130 may include at least one of a touch panel, a pen sensor, and keys for receiving alphanumeric input and configuring various functions. The touch panel may be implemented in one of capacitive, resistive, infrared, and microwave types to recognize the touch input made by the user. The touch panel may include a controller (not shown). In the case of the capacitive type, it is possible to recognize proximity input as well as touch input. The pen sensor may be implemented with a pen-recognition sheet in the same way as receiving user's touch input.

The storage unit 140 may store commands or data received from the control unit 150 and other components (e.g., display unit 120, input unit 130, and communication unit 110) and data generated by the components. For example, the storage unit 140 may store an operating system (OS) for booting up the electronic device and operating the aforementioned components, at least one application, messages exchanged with the network, and data generated according to running applications.

The storage unit 140 may store programming modules such as kernel, middleware, application programming interfaces (API), and an application. The programming modules may be implemented with one or a combination of at least two of software, firmware, and hardware.

The storage unit 140 may include at least one of internal and external memories. The internal memory may include at least one of a volatile memory (e.g., dynamic random access memory (DRAM), static RAM (SRAM), and synchronous dynamic RAM (SDRAM)) and a non-volatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory).

According to an embodiment, the internal memory may be a solid state drive (SSD). The external memory may include a flash drive (e.g., compact flash (CF), secure digital (SD), micro secure digital (Micro-SD), mini secure digital (Mini-SD), extreme digital (xD), and Memory Stick). The external memory may connect to the electronic device 101 through various interfaces. According to an embodiment, the electronic device 101 may further include a storage device (or storage medium) such as a hard drive.

The control unit 150 may decipher function execution commands from components of the electronic device, execute operations according to the function execution commands, and process data. For example, the control unit 150 may execute an OS or embedded software program to control hardware components connected to the control unit 150. The control unit 150 may include at least one processor. The control unit 150 may process image data according to the electronic device property and controls the display unit 120 to display the image data.

The control unit 150 may include an entity recognizer 151, a relevant information searcher 152, a content configurator 153, an analyzer 154, a screen controller 155, and a function executor 156. Although descriptions are made of the operations of the respective components constituting the control unit 150, the operations of the control unit 150 are not limited thereto. The control unit 150 may perform all of the operations of the entity recognizer 151, the relevant information searcher 152, the content configurator 153, the analyzer 154, the screen controller 155, and the function executor 156.

The entity recognizer 151 may analyze text input in the text input mode (or on the screen of the display unit) and recognize an entity in the text. The entity may be a unit of information stored in the electronic device. Examples of an entity include an object containing information, an object expressed as data, a thing, a person, a place, an event, and a concept that can be identified as an informative tangible/intangible target. The entity may be categorized into one of various types. Examples of the entity type include a person name type, a place type, a time type, an object type, and a content type.

The entity recognizer 151 may check the input text by character to recognize the entity. For example, the entity recognizer 151 may analyze a Korean language text by 2 bytes and English and numeric texts by 1 byte to recognize entities.

The entity recognizer 151 may recognize an entity while receiving text input. Suppose that the user enters a text "Tom comes from France." The entity recognizer 151 may recognize "France" as a country type entity upon detecting the input of the last character "e" when 'France' is input by a user.

The relevant information searcher 152 may search for one or more pieces of relevant information (e.g., relevant contents) using an entity text as the search keyword. The relevant information searcher 152 may search for the relevant information including entity text recognized in the title, metadata, and content of the text.

The relevant information search may be performed inside or outside of the electronic device 101. The internal search is an operation of searching information stored in the electronic device for the information (content) related to the entity. The relevant information searcher 152 may search the data stored in the application (or memory) installed in the electronic device such as a contact, document, business card, song, photo, video, schedule, diary, alarm, clipboard, memo, note, message, and scrap to find the relevant information based on the text of the entity.

For example, if an entity text "Angelina Jolie" is found, the relevant information searcher 152 may retrieve a contact mapped to Angelina Jolie in the phonebook application as the relevant information.

The external search may be an operation of collecting and searching for the information relevant to the object by means of an external device, e.g., a website and a web server. The external search may be capable of acquiring relevant information through an external server or external database (e.g., a location information server and a coupon service provision server) which interoperates with the application installed in the electronic device 101. For this purpose, the relevant information searcher 152 may transmit the entity text to the external server by means of the communication unit 110 to make a search request. The relevant information searcher 152 may acquire the information relevant to the entity from the external server.

For example, the relevant information searcher 152 may acquire coupon information related to Burger King™ from an external coupon service server and Burger King store location information from an external location service server as an external search result with the entity text comprising any one of 'burgerking', 'Burger King', and 'BurgerKing' or something similar thereto.

The relevant information searcher 152 may select one of the found pieces of relevant information and send the selected relevant information to the screen control unit to display. The relevant information searcher 152 may sort the entities by type, allocate priorities in the order of relevance, and select the relevant information with the highest priority.

For example, if the entity text, e.g., Gangnam station, is categorized into the place type, the relevant information searcher 152 may retrieve the location information, location-related event information, and location-related coupon information as recommended relevant information. If the entity text, e.g., Jane, is categorized into the person name type, the relevant information searcher 152 may retrieve the contact information matching Jane and personal information found in a website as recommended relevant information.

The content configurator 153 may generate content with text input by a user and relevant information selected in response to the user input. The content configurator may configure the text input by the user as a normal text and the relevant information as metadata. The content configured with the relevant information may be communicated between electronic devices through a text-based (e.g., message) communication protocol.

According to an embodiment, if the text-based content is a message, the message including the relevant information as metadata may be structured in the format of text content to which the relevant information is tagged, as shown in Table 1.

TABLE 1

Format 1:
Normal text [entity text] {entity-related information key = entity-related information value, .., ..}{..}...normal text...
Sample:
[Gangnam station]{Entity ID=0, EntityType=Place, InfoType=Map, AppType=Map, AppParam=232231}{Entity ID=1, EntityType=Place, InfoType=Coupon, AppType=Wallet, AppParam="couponId:131232"} How about? [KimSamsung]{ID=2, EntityType=PersonName, InfoType=Contact, AppType=Contact, AppParam="name:Kim Samsung,phone1:01037994234"} comes too.

Here, the normal text is the text input by the user, and the entity text is text recognized as an entity among the normal text. The data related to the relevant information linked to the entity text may be inserted as metadata after the entity text. The relevant information data may include entity type, relevant information type, relevant information-related application information, description of the relevant information. In Table 1, the text "How about Gangnam station? Kim Samsung comes too." is entered by the user, and 'Gangnam station' and 'Kim Samsung' are entity texts. The relevant information (e.g., map information and coupon information) linked to 'Gangnam station' is inserted next to the text 'Gangnam station', and the relevant information (e.g., contact information) linked to 'Kim Samsung' is inserted next to the text 'Kim Samsung'.

According to another embodiment of the present disclosure, the message may be formatted, as shown below in Table 2, in which the text entered by the user is followed by the relevant information.

TABLE 2

Format 2:
Normal text entity text...normal text...
{entity location, (entity-related information key, entity-related information value)}, ....
Sample:
How about Gangnam station? Kim Samsung will come too.
{Entity ID=0, EntityType=Place, InfoType=Map, AppType=Map, AppParam=232231, Position=1-3}
{Entity ID=1, EntityType=Place, InfoType=Coupon, AppType=Wallet, AppParam="couponId:131232" Position=1-3}
{Entity ID=2, EntityType=PersonName, InfoType=Contact, AppType=Contact, AppParam="name: executive director Kim Samsung,phone1:01037994234" Position=9-11}

In Table 2, the relevant information data linked to the entity texts may be inserted next to the message content entered by the user. The message content may be followed by the location information data related to the place type entity (e.g., Gangnam station) and the coupon information data as relevant information, and the contact data linked to the person name type entity (e.g., Kim Samsung) may be inserted as the relevant information. In Table 2, the position of the entity to which the relevant information is linked may be checked with the location information of the normal text (e.g., Position=1-3 (Gangnam station) and Position=9-11 (Kim Samsung)).

The relevant information data may include, without limitation thereto, the information fields as shown below in Table 3.

TABLE 3

| | |
|---|---|
| ID | Unique number |
| Value | Entity value (e.g., executive director Na Samsung) |
| EntityType | Entity type. (e.g., person name, address, phone number, place name, normal keyword, date, and time) |
| InfoType | Supplemental relevant information type. (e.g., map information, contact, schedule, phone number) |
| AppType (plural is allowed) | Application type (phonebook, calendar, and predefined applications) |
| AppParam (plural is allowed) | Linked application parameter. information format of parameter to be transmitted along with URI in execution of application |
| Position (optional) | (Only for format 2) indicate position of the entity in the original text. |

The analyzer 154 may analyze text-based contents. The analyzer 154 may determine whether there is any entity text linked to the relevant information and sort the texts and relevant information to be displayed on the screen. The analyzer 154 may sort the normal text and entity texts linked to the relevant information in the text-based content and transfer the analysis result to the screen controller 155.

The analyzer 154 may check the relevant information according to the relevant information data fields of table 3, acquire the information to be displayed on the screen and app information, and transmit the acquired information to the screen controller 155.

The screen controller 155 may control such that the entity text with relevant information is displayed so as to be distinct from other text entered by the user. For example, if relevant information is detected while the user inputs text, the screen controller 155 may control such that the entity text is displayed with an underline. The screen controller 155 may control to highlight the entity text with various effects in addition to the underline, or without the underline, so as to notify the user that relevant information has been found.

If an input for selecting the distinguished, e.g., highlighted, entity text is detected, the screen controller 155 may control to display at least one relevant information item corresponding to the relevant information retrieved by the relevant information searcher 152 on the screen.

The screen controller 155 may control to display the entity text such that the entity text with linked relevant information is distinguished from the entity text without liked relevant information. For example, the screen controller 155 controls such that the entity text with linked relevant information is highlighted while the entity text without linked relevant information is underlined in order for the user to check the presence of relevant information and linked state of the relevant information.

If there is an entity with relevant information in the text-based content, the screen controller 155 may control such that the entity text with linked relevant information is distinguished from other normal texts. For example, the screen controller 155 controls such that the entity text with linked relevant information is highlighted on the text display screen.

If a user input for selecting the entity with linked relevant information is detected, the screen controller 155 may control such that at least one relevant information item linked to the entity is displayed on the screen.

The function executor 156 may execute a function (or application) related to the relevant information, or display details of the relevant information, in response to the user input for selecting the relevant information item.

Descriptions are made of the text-based content transmission and reception operations of the electronic device (e.g., electronic device 101) hereinafter.

The text-based content management method, according to various embodiments of the present disclosure, may be divided into the transmission procedure of a transmitter 201 for transmitting contents and the reception procedure of a receiver 202 for receiving the contents. Such a division is made just for convenience of explanation but the electronic device (e.g., electronic device 101) is capable of operating as both the transmitter and receiver.

Figure 2:
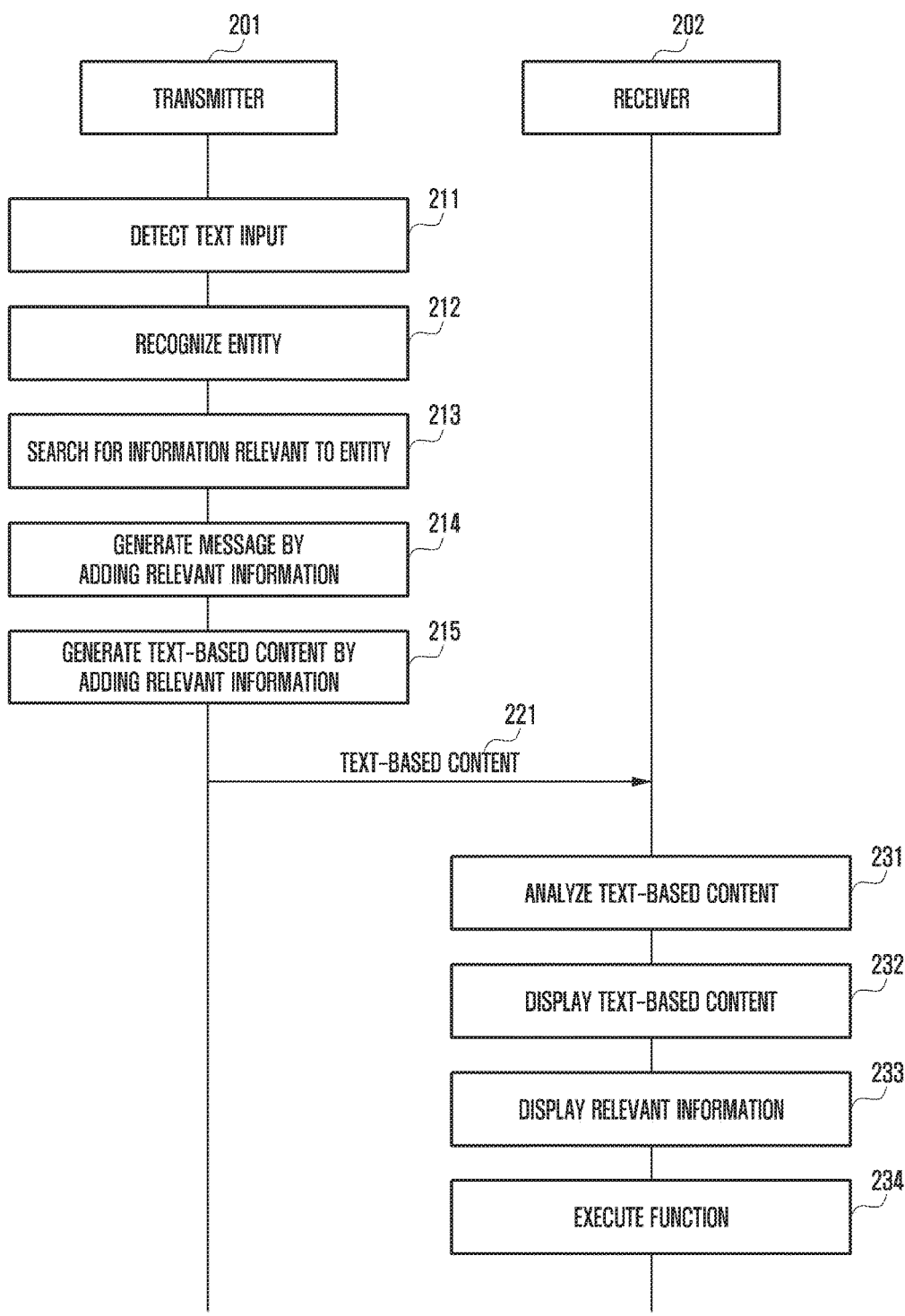
FIG. 2 is a flowchart illustrating text-based content transmission and reception operations of the electronic device according to various embodiments of the present disclosure.

FIG. 2 is a flowchart illustrating the text-based content transmission and reception operations of the electronic device according to various embodiments of the present disclosure.

Referring to FIG. 2, the transmitter 201 may detect text input of a user while the electronic device is in text input mode. For example, the transmitter 201 may display text corresponding to characters/letters input by the user for composing a message or memo on the screen in real time at operation 211.

The transmitter may recognize entities among the input text at operation 212. The transmitter 201 analyzes the input text and retrieves an entity matching relevant information at operation 212.

The transmitter 201 may configure the corresponding text of the recognized entity as a search keyword used to search for any relevant information associated with the recognized entity at operation 213. The relevant information search may include an internal search performed inside the electronic device and an external search performed outside the electronic device. If information relevant to the recognized entity is found, the transmitter displays the entity text with a distinguishing effect (e.g., an underline) so as to be distinguished from other normal texts.

According to an embodiment of the present disclosure, operation 213 may performed in parallel with or prior to operation 212.

The transmitter 201 may display the relevant information in response to a relevant information display request at operation 214. The relevant information display request may be a signal input for selecting the entity text with the relevant information, i.e., underlined.

For example, the transmitter 201 may display relevant information items representing the respective relevant information in the form of a list on the screen. The relevant information items may include a summary of the relevant information and a selection item for receiving a user's selection input.

The transmitter 201 may select at least one of the relevant information items.

The transmitter 201 may generate the text-based content by linking the relevant information selected in response to the user input to the entity text at operation 215.

The transmitter 201 may display the entity text of which relevant information is found so as to be distinguished from the entity text to which the relevant information is linked. For example, the entity text of which the relevant information is found may be underlined while the entity text to which the relevant information is linked may be highlighted, or vice versa.

The transmitter 201 may generate the text-based content by expressing the text corresponding to the characters input by the user as normal text and the entity text and relevant information in the format of metadata.

The transmitter 201 may transmit the text-based content formed with the text input by the user and the relevant information to the receiver 202 in response to a transmission request input at operation 221.

A description is made of the operation of the receiver, which has received a message from the transmitter, hereinafter.

The receiver 202 may receive text-based content from the transmitter 201 and analyze the text-based content to check whether any entity linked to the relevant information is included in the text-based content at operation 231. The receiver 202 may analyze the content format to check the entity text with linked relevant information and the normal text.

The receiver 202 may display the text-based content in response to a content display request at operation 232. The receiver may display the entity text so as to be distinguished from the normal text on the screen. For example, the receiver 202 may display the entity text as highlighted on the screen.

The receiver may detect a user input for selecting the entity text.

The receiver 202 may display the relevant information linked to the entity text selected in response to the user input at operation 233. For example, the receiver 202 may display the relevant information item representing the relevant information on the screen in the text-based content display mode. The relevant information item may include a summary of the relevant information and any related application information.

The receiver 202 may detect a user input for selecting the relevant information item displayed on the screen.

The receiver 202 may provide a screen displaying details of the relevant information or execute a function (or application) corresponding to the relevant information in response to a user input for selecting the relevant information item on the screen at operation 234.

Figure 3:
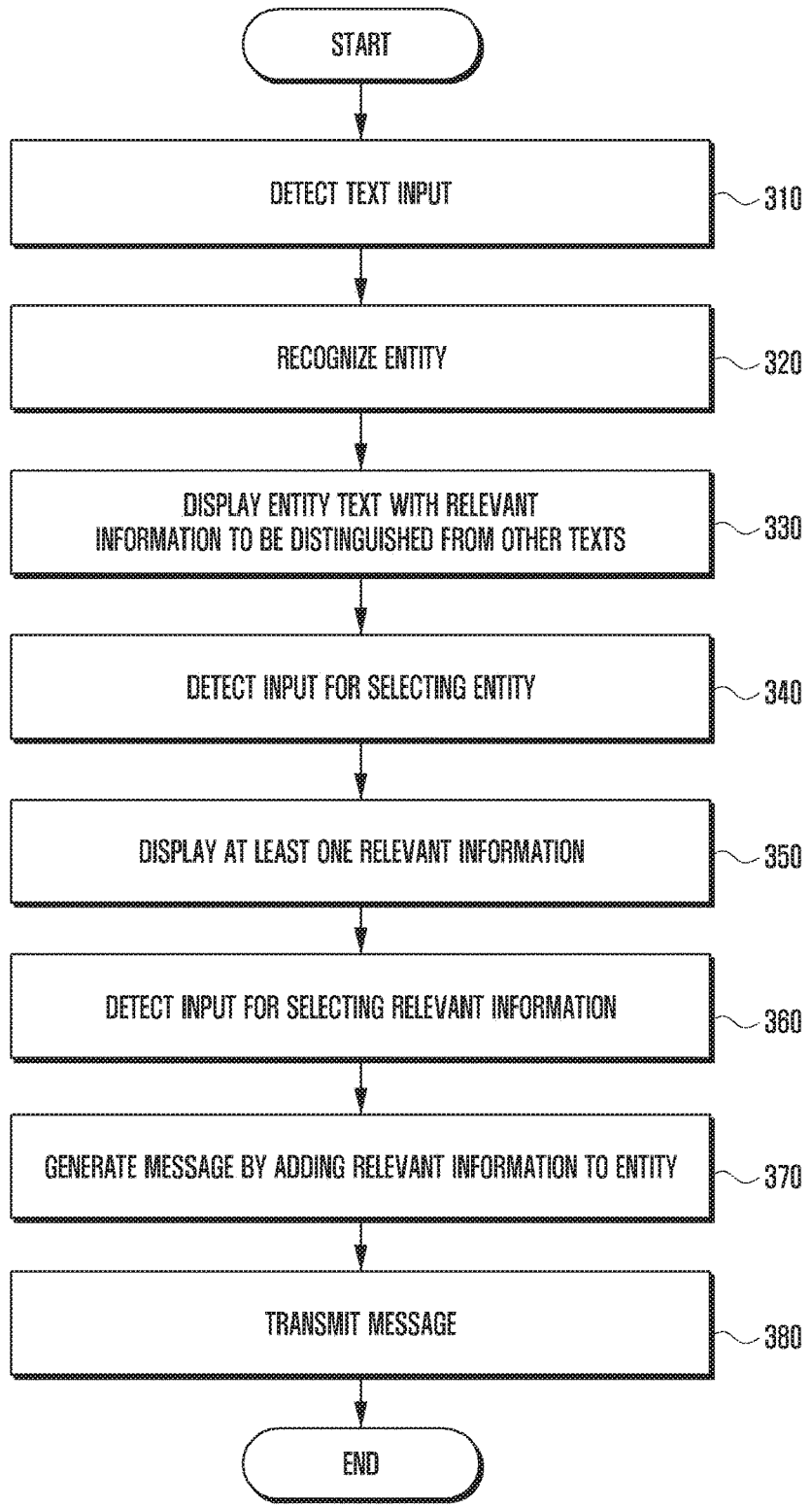
FIG. 3 is a flowchart illustrating a message transmission method of the electronic device according to various embodiments of the present disclosure.
Figure 4:
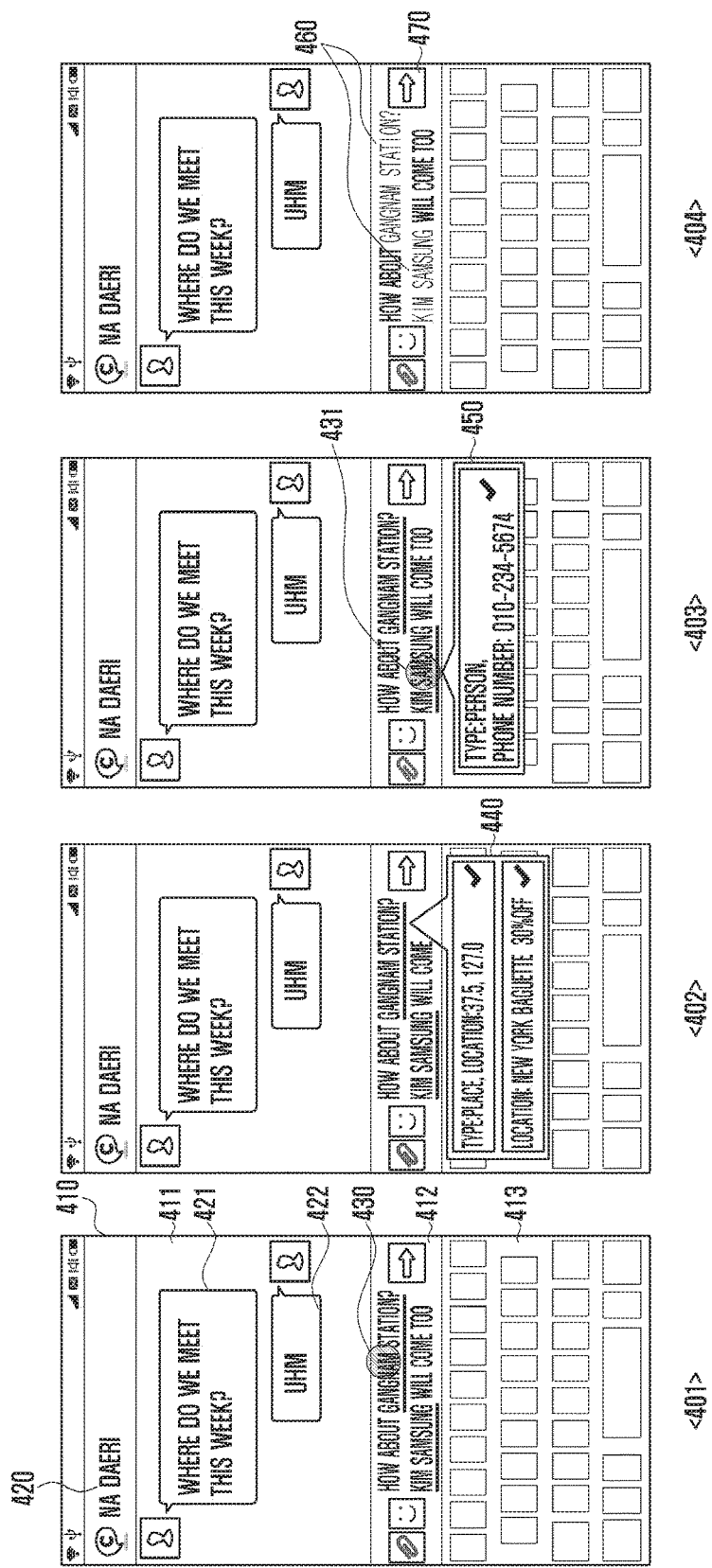
FIG. 4 is a diagram for explaining the message transmission method according to various embodiments of the present disclosure.

FIG. 3 is a flowchart illustrating a message transmission method of the electronic device according to various embodiments of the present disclosure, and FIG. 4 is a diagram for explaining the message transmission method according to various embodiments of the present disclosure.

Referring to FIG. 3, the control unit 150 of the electronic device (e.g., electronic device 101 of FIG. 1 and transmitter 201 of FIG. 2) may detect the input of characters by means of the input unit (e.g., keypad) in the text input mode at operation 310. In this process, the control unit 150 may control the display unit 120 to display the text corresponding to the characters in real time. Although the description is directed to the message composition operation, the present disclosure is applicable to various text-based operations, such as email composition, schedule organization, and memo in the text input mode.

The control unit 150 may control the display unit 120 to display the message composition screen 410 in response to the message composition request input as denoted by exemplary screen display 401 of FIG. 4. The message composition screen may include a counterpart identity window 420, a chatting window 411, a text input window 412, and a keypad window 413. The counterpart identity window 420 may be an area for displaying the identity information of the counterpart, and the chatting window 411 may be an area for showing the chat messages input by the users participated in the chatting. The chatting window 411 may show the incoming message 421 input by the counterpart and the outgoing message 422 input by the user in a temporal order. The text input window 412 may be an area for showing the text corresponding to the characters input by means of the keypad window 413 in real time. The user may select characters on the keypad window 413 to input a text to be send to the counterpart, the text being entered into the text input window 412.

The control unit 150 may check the text input into the text input window 412.

The control unit 150 may analyze the text corresponding to the input characters to recognize any entity at operation 320. The control unit 150 may recognize text which may be meaningful or has or matches relevant information as an entity. The control unit 150 may perform the internal search to search the data stored in the electronic device and the external search to request an external device to search and transmit a search result. The external search may be performed in such a way that an external device interoperating with the application (or function) installed in the electronic device performs the search operation, but is not limited thereto.

The control unit 150 may search for relevant information with the input texts as search keywords. If there is any information matching one of the title, metadata, and body of the text content in the state of being receiving the text input, the control unit 150 may retrieve that information as relevant information.

For example, the control unit 150 may retrieve the information stored/managed with the keyword "Gangnam station" (e.g., map/photos with the metadata of Gangnam station, coupon information with the keyword of Gangnam station, and weather information of Gangnam station) as relevant information. The control unit 150 may also retrieve the information stored/managed with the keyword "Kim Samsung" (e.g., contact information stored with the name Kim Samsung) as relevant information.

The control unit 150 may control such that the entity text with the relevant information as a search result is displayed in such a manner so as to be distinguished from other texts at operation 330.

For example, the user may input a message "How about Gangnam station? Kim Samsung comes too" into the text input window 412 by means of the keypad window 413. The control unit 150 may recognize Gangnam station and Kim Samsung as text entities among the text displayed in the text input window 412. The control unit 150 may control such that the text entities of Gangnam station and Kim Samsung having relevant information are underlined so as to be distinguished from other texts. The user may recognize the presence of the relevant information by checking the text entities of underlined Gangnam station and Kim Samsung.

The control unit 150 may detect a user input for selecting an entity text having the retrieved relevant information at operation 340. For example, the user may recognize the presence of relevant information related to Gangnam station by the underlined Gangnam station entity text and make a selection (e.g., touch) input as denoted by reference number 430 to add the relevant information to the message.

The control unit 150 may control the display unit 120 to display the relevant information retrieved with the search keyword of the selected entity at operation 350. The relevant information may be displayed in the form of a popup window extending from the text input window 410. The control unit 150 may control to display the relevant information items 440 representing the relevant information in the form of a list as denoted by exemplary screen display 402 of FIG. 4. The relevant information items 440 may include respective selection items for selecting summary information of the relevant information and corresponding items.

According to an embodiment of the present disclosure, the control unit 150 may control to perform the operation of recommending relevant information based on display priorities among the retrieved relevant information and display the recommended relevant information. The display priorities of the relevant information may be assigned such that the scope of the recommended relevant information and a number of pieces of relevant information to be displayed are determined differently depending on a type of the entity. For example, if the entity type is 'place', the scope of the recommended relevant information may be set to map information, coupon information, and/or traffic information. If the entity type is 'person name', the scope of the recommended relevant information may be set to contact information, account information, and/or SNS information.

According to another embodiment of the present disclosure, the control unit 150 may not perform the operation of selecting the recommended relevant information and display the retrieved relevant information on the screen. In this case, the control unit 150 may provide the relevant information items in the form of a list that can be scrolled on the screen.

The control unit 150 may detect a user input for selecting at least one relevant information item at operation 360. The user may check the relevant information, i.e., location information and coupon information, presented in response to the selection of the entity text 'Gangnam station' on the exemplary screen 402 and select the relevant information item to be added to the message.

The control unit 150 may generate a message including a plurality of pieces of relevant information corresponding to one entity text. In the case that a plurality of pieces of relevant information is displayed, the user may select both a location information item corresponding to the Gangnam station entity and a coupon information item.

The user may recognize the presence of the relevant information of the entity text Kim Samsung by checking that the entity text Kim Samsung is underlined as denoted by exemplary screen display 403. The user may make an input for selecting the underlined text Kim Samsung as denoted by reference number 431. The control unit 150 may control to display contact information item 450 stored in association with Kim Samsung in response to the user input for selecting the text Kim Samsung.

The control unit 150 may generate the message including the relevant information linked to the entity text in response to the input for selecting the relevant information at operation 370.

The control unit 150 may generate the message along with the relevant information in the format of metadata in separation with the text body input by the user. Since the message format having the relevant information in the form of metadata has been described with reference to FIG. 1, a detailed description thereof is omitted herein.

According to an embodiment of the present disclosure, the control unit 150 may control such that the entity with the linked relevant information is displayed so as to be distinguished from the entity without any linked relevant information. The entity text with the linked relevant information may be distinguished from other text entities in at least one of color, boldness, shape, and other visual effects.

For example, the control unit 150 may control such that the entities with the relevant information are underlined as shown in the exemplary screen display 401. In the case that there is any relevant information linked to the recognized entity text, the control unit 150 may control such that the entity text with the linked relevant information 460 is different in font type or highlighted to be distinguished from other texts, as shown in the exemplary screen display 404.

The control unit 150 may transmit the message including the body text input by the user and the relevant information to a counterpart device in response to a message transmission request at operation 380.

For example, the user may add the information relevant to the entity text to the message and then select a 'send' button 470 as shown in the exemplary screen display 404. The control unit 150 may detect the user input for selecting 'send' button 470 and transmit the message including the relevant information to the counterpart electronic device.

Figure 5:
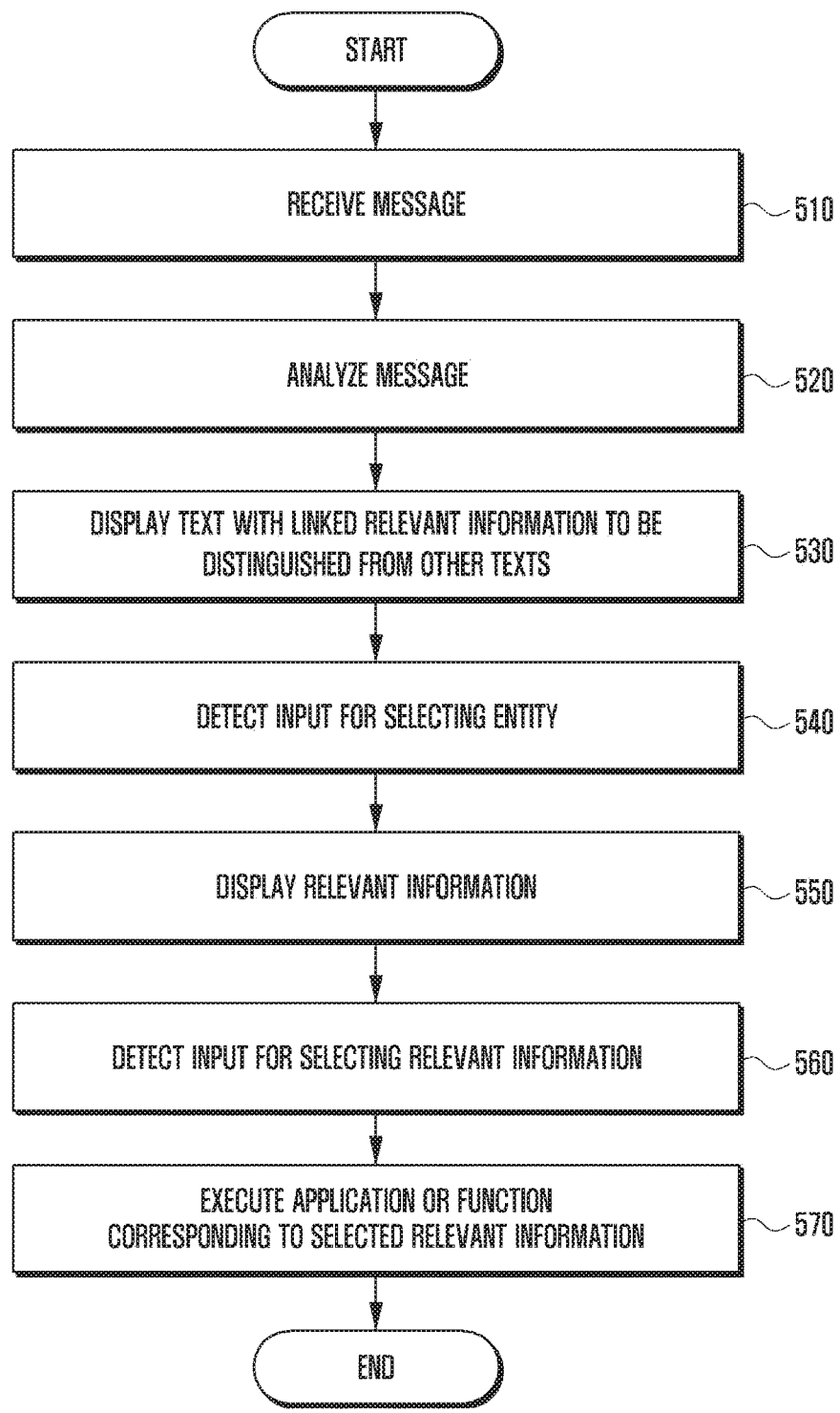
FIG. 5 is a flowchart illustrating a message reception method of the electronic device according to various embodiments of the present disclosure.
Figure 6:
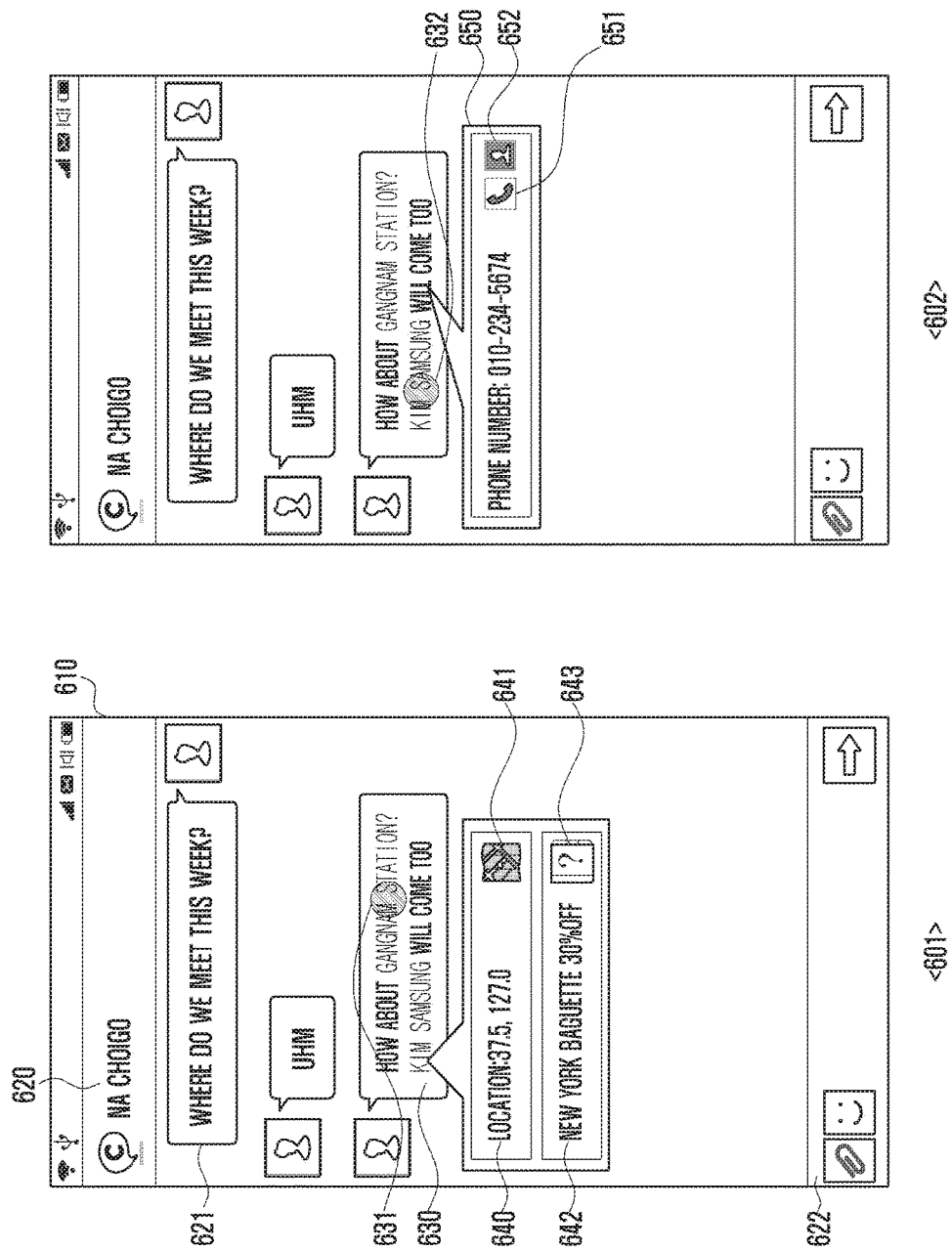
FIG. 6 is a diagram illustrating exemplary screen displays for explaining the message reception method according to various embodiments of the present disclosure.

FIG. 5 is a flowchart illustrating a message reception method of the electronic device according to various embodiments of the present disclosure, and FIG. 6 is a diagram illustrating exemplary screen displays for explaining the message reception method according to various embodiments of the present disclosure.

Referring to FIG. 5, the control unit 150 receives a message from an external device at operation 510.

The control unit 150 may analyze to check an entity to which relevant information is linked in the received message at operation 520. The control unit 150 may analyze the message format to check the text body to be displayed on a message reception screen 610 and the entity text to which the relevant information is linked.

If the received message includes an entity having linked relevant information, the control unit 150 may control to display the entity text having the linked relevant information so as to be distinguished from other texts on the screen at operation 530.

For example, the control unit 150 may control the display unit 120 to display the message reception screen 610 in response to a message reception check request as shown in FIG. 6. The message reception screen may include a counterparty identity window 620, a chatting window 621, and a text input window 622. The control unit 150 may control such that the text with the relevant information is displayed in a first type of font and the other texts are displayed in a second type of font. The control unit 150 may control such that the text with the relevant information is highlighted in various ways to notify the user of the presence of relevant information.

The control unit 150 may detect a user input for selecting the entity to which the relevant information is linked at operation 540.

For example, the user may check the text displayed in the first type of font (e.g., Gangnam station and Kim Samsung) in the received message as shown in the exemplary screen display 601 so as to recognize the presence of relevant information. The user may make a selection input to the Gangnam station entity as denoted by reference number 631.

The control unit 150 may control to display the relevant information linked to the entity on the screen in response to the user input for selecting the entity at operation 550. The control unit 150 may control to display relevant information items representing the relevant information in the form of a popup window on the message reception screen 610.

For example, the control unit 150 may control such that the location information item 640 and a coupon information item 642 are displayed on the screen in response to the user input for selecting the text entity Gangnam station as shown in the exemplary screen display 601 of FIG. 6. The location information item includes a summary of the location and a map application icon 641, and the coupon information item includes a summary of the coupon and a coupon service application icon 643.

According to an embodiment of the present disclosure, the control unit 150 may control such that a contact information item 650 linked to Kim Samsung entity is displayed on the screen in response to the user input for selecting Kim Samsung as denoted by reference number 632 as shown in the exemplary screen display 602 of FIG. 6. The contact information item 650 may include a phone number of Kim Samsung, a call function icon 651, and a contact information icon 652.

The control unit 150 may detect a user input made for selecting the relevant information at operation 560. The control unit 150 may execute a function (or application) corresponding to the relevant information or display details of the relevant information in response to the user input for selecting the relevant information on the screen at operation 570.

The user may check the text transmitted received from the counterpart on the message reception screen, recognize the presence of the relevant information linked to the text, and check the relevant information or execute a function related to the relevant information without extra execution manipulation.

Descriptions are made of the operations of executing the function corresponding to the relevant information and displaying the details of the relevant information hereinafter with reference to FIGS. 7 and 8.

Figure 7:
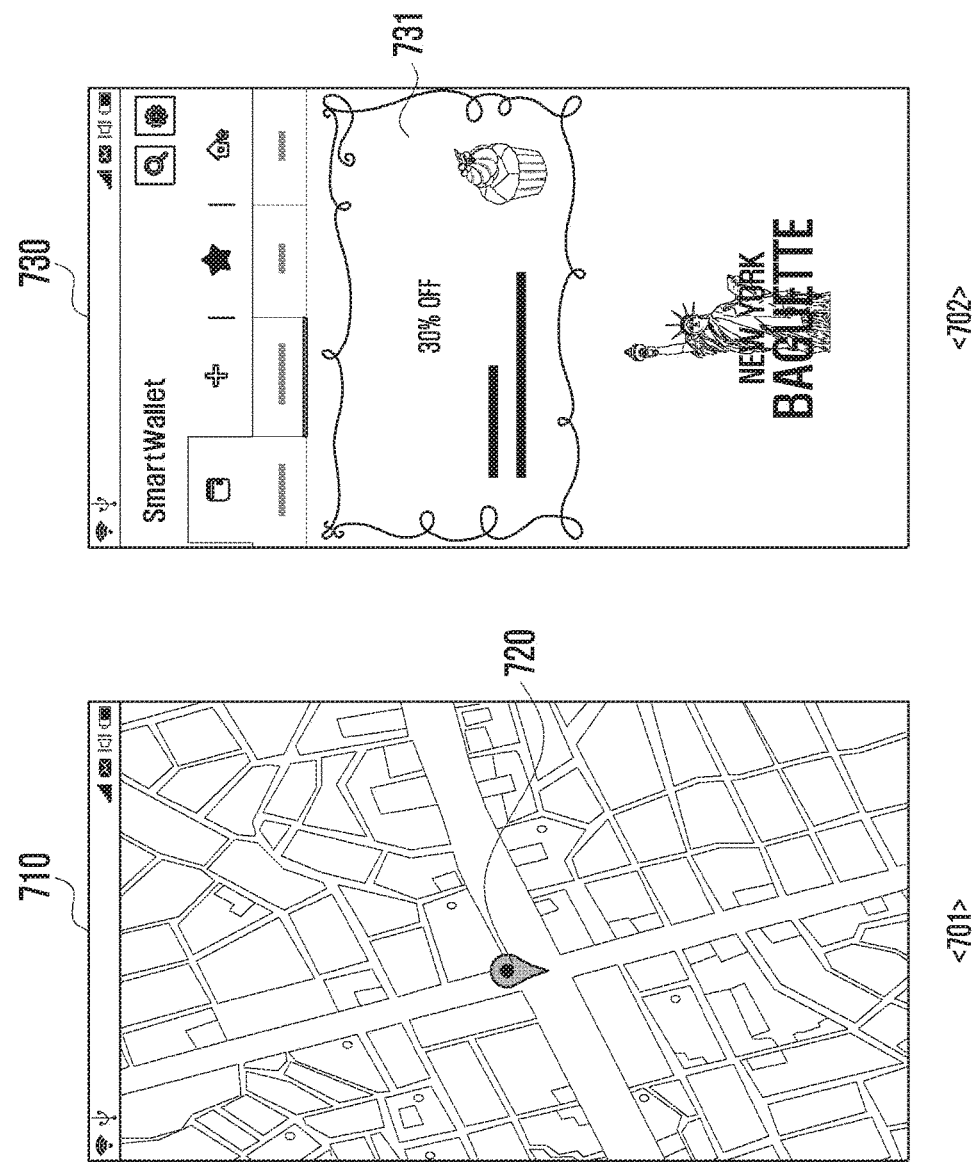
FIG. 7 is a diagram illustrating exemplary text-based content manipulation screen displays according to various embodiments of the present disclosure.

FIGS. 7 and 8 are diagrams illustrating exemplary text-based content manipulation screen displays according to various embodiments of the present disclosure.

Referring to FIG. 7, the electronic device (e.g., electronic device 101 of FIG. 1) may provide the relevant information with the entity text of the text-based content or execute a function related to the relevant information.

According to an embodiment, the user may call the relevant information item linked to Gangnam station by selecting via input 631 the Gangnam station as one of the entity texts displayed on the message reception screen 610 as shown in the exemplary screen display 601 of FIG. 6. The user may select the location information item 640 or the map icon 641 among the relevant information items. In response to the user input for selection the location information icon 640 or map icon 641, the control unit 150 may execute a map application providing a map service and mark the location of the Gangnam station 720 on map application execution screen 710 as shown in the exemplary screen display 701. In order to acquire more information on the location of the Gangnam station, the user may recognize the presence of the relevant information related to the Gangnam station and check the location information related to the Gangnam station.

According to an embodiment of the present disclosure, the user may select the coupon information item 642 or the coupon icon 643. In response to the user input for selecting the coupon information item 642 or the coupon icon 643, the control unit 150 may execute the application providing a coupon service and display information 731 on the coupons that can be used around the Gangnam station on a coupon application execution screen 730 as shown in the exemplary screen display 702.

The user may call the relevant information item linked to Kim Samsung 630 among the entity texts displayed on the message reception screen 610 as shown in the exemplary screen display 602 of FIG. 6.

For example, the user may recognize the presence of the relevant information of Kim Samsung in addition to Gangnam station as shown in the exemplary screen display 602. The user may select a call function icon 651 associated with the phone number of Kim Samsung in the contact information item. In response to the selection input made to the call function icon, the control unit 150 may execute the call function and control the display unit to display the screen 810 in order for the user to place a call to Kim Samsung as shown in the exemplary screen display 801.

For example, the user may select the contact information icon 652 in the contact information item. In response to the user input made for selecting the contact information icon 652, the control unit 150 may execute the contact management application and control the display unit to display a screen 820 in order for the user to store the phone number of Kim Samsung as shown in the exemplary screen display 802.

Figure 9:
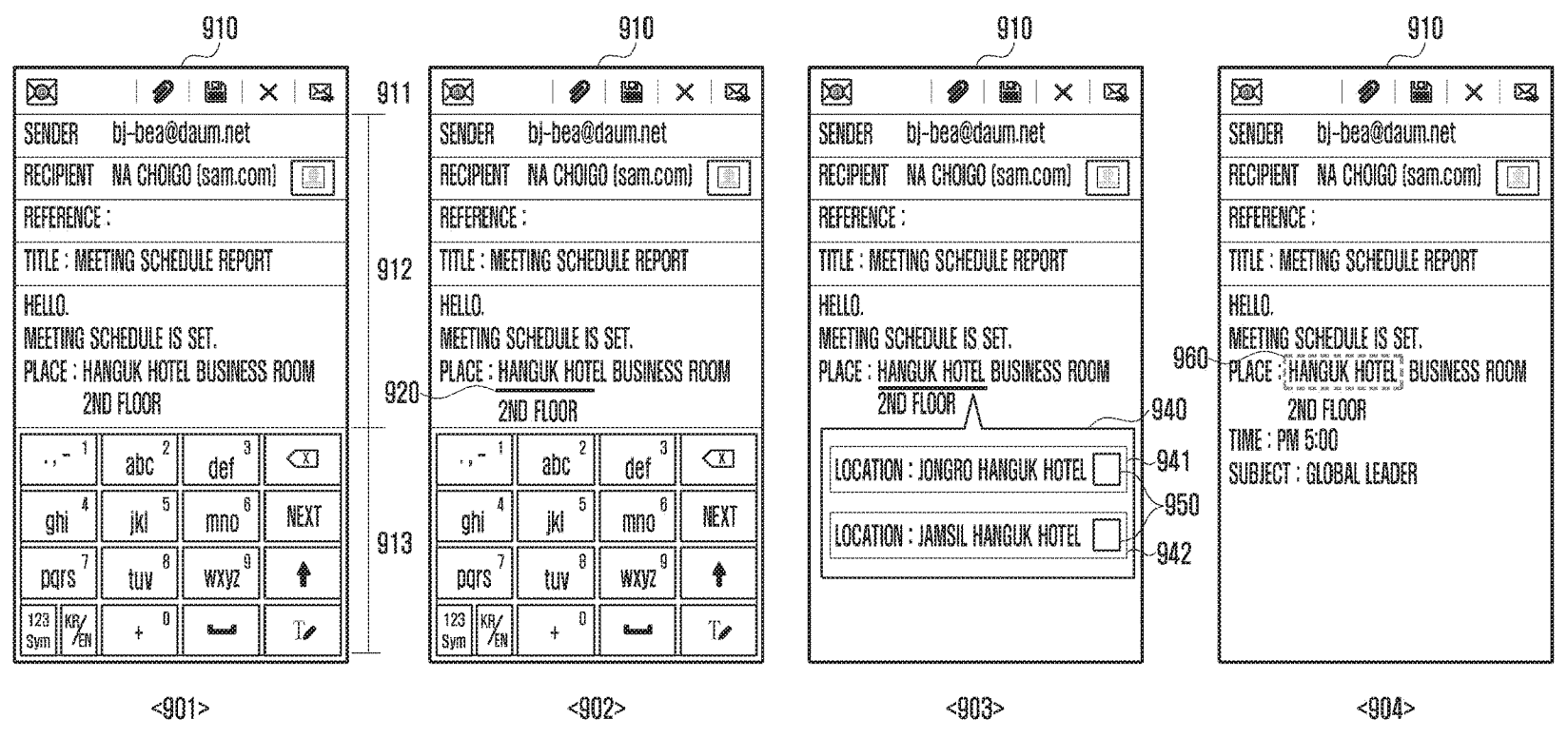

FIG. 9 is a diagram illustrating exemplary screen displays for explaining the text-based content management method according to various embodiments of the present disclosure.

Referring to FIG. 9, the electronic device (e.g., electronic device 101 of FIG. 1) according to various embodiments of the present disclosure may run various text-based content applications, such as an email application. The electronic device may recognize entities in the text input by the user and add relevant information related to the entities, and transmit the text-based content including the relevant information to a counterpart electronic device.

According to an embodiment of the present disclosure, the control unit 150 may execute the email application in response to an execution request and control the display unit 120 to display an email composition screen 910 as shown in the exemplary screen display 901.

The user may input text on an email composition screen 910. The email composition screen 910 may include an email menu region 911, a text display region 912, and a keypad region 913. The email menu region 911 may include a file attach item, a save item, a delete item, and a send item. The text display region may be the region of displaying the text corresponding to the characters input by the user using the keypad region 913 in real time.

The control unit 150 may analyze the text input by the user on the email composition screen 910 to detect entities and, if relevant information is retrieved in association with the detected entities, control such that the entity text having the relevant information is displayed so as to be distinguished from other texts as shown in the exemplary screen display 902.

For example, the user may try to send an email to notify a counterpart of a meeting schedule. The control unit 150 may recognize the entity "Hanguk hotel" in the text input on the email composition screen 910 and underline the text "Hanguk hotel" 920 as shown in the exemplary screen display 902.

The user may be aware of the presence of the relevant information by means of the underlined entity text 'Hanguk hotel' 920.

The user may make a selection input (e.g., touch) on the underlined text "Hanguk hotel" 920 in order to add information relevant to the Hanguk hotel. In response to a selection input made on the text "Hanguk hotel", the control unit 150 may control the display unit 120 to display relevant information 940 of the Hanguk hotel as shown in the exemplary screen display 903. The relevant information 940 may include at least one of relevant information items 941 and 942 retrieved in association with the Hanguk hotel and respective selection items 950 for selecting the respective relevant information items.

The user may select the Jongro Hanguk hotel 941 corresponding to the meeting place by means of the selection items 950. The control unit 150 may link the location information of the Jongro Hanguk hotel to the text "Hanguk hotel" 920.

In the case of attaching the location information of the Jongro Hanguk hotel to the text "Hanguk hotel", the control unit 150 may control such that the text "Hanguk hotel" is distinguished from other texts. For example, the control unit 150 may control such that the text "Hanguk hotel" 960 having the linked relevant information is highlighted as shown in the exemplary screen display 904.

If a user inputs a request for transmitting the email, the control unit 150 may send the counterpart electronic device the relevant information linked to the entity along with the email content input by the user.

Figure 10:
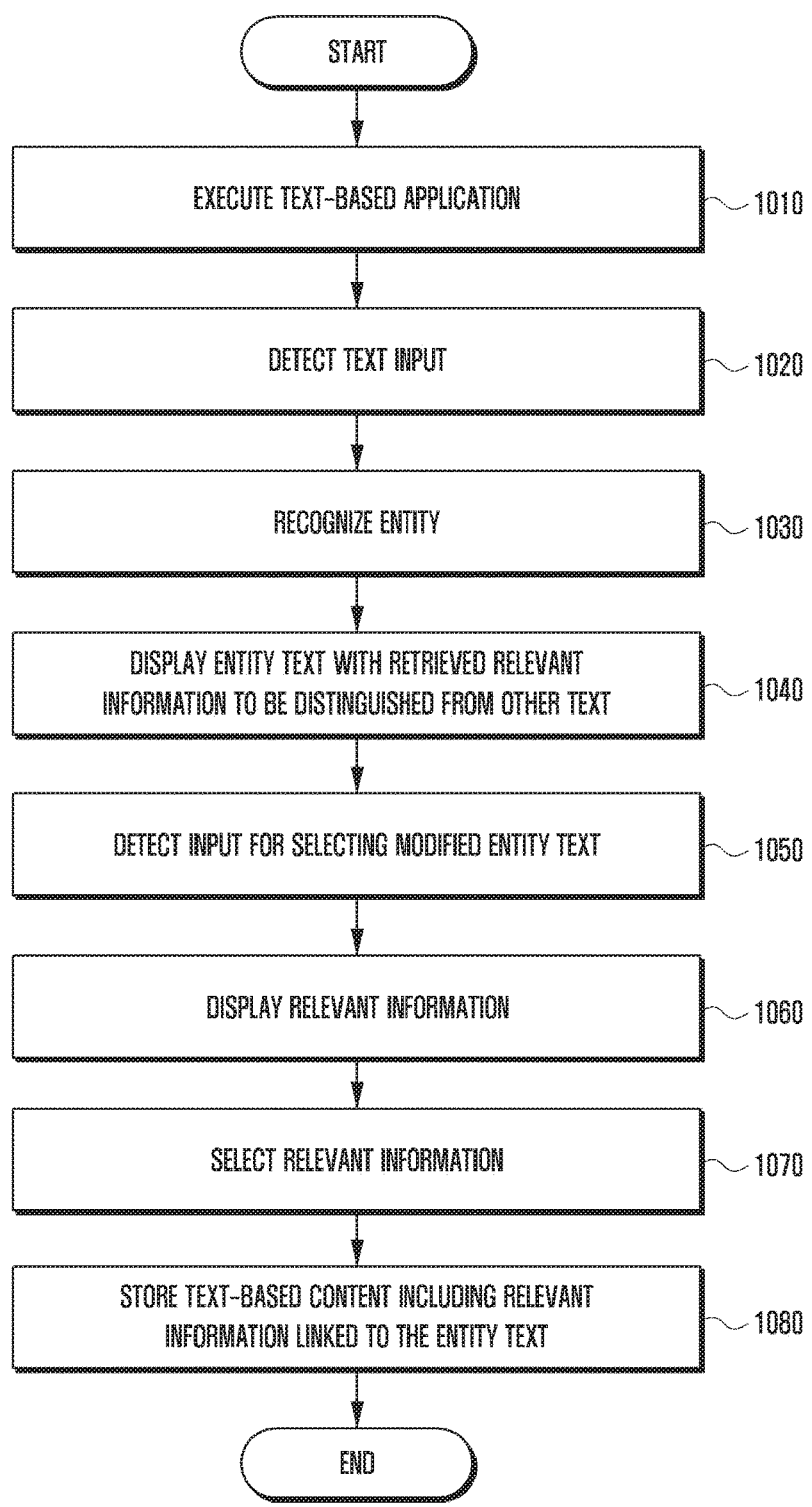
FIG. 10 is a flowchart illustrating a text-based content management method of the electronic device according to various embodiments of the present disclosure.

FIG. 10 is a flowchart illustrating a text-based content management method of the electronic device according to various embodiments of the present disclosure.

Referring to FIG. 10, the control unit 150 of the electronic device (e.g., electronic device 101 of FIG. 1) may execute a text-based application at operation 1010. The text-based application may be any one of a memo, note, document edition, and schedule organization application supporting text input of the user.

The control unit 150 may detect characters input at operation 1020. The control unit 150 may control to display the text corresponding to the input characters on the screen at operation 1020. The control unit 150 may analyze the text to detect an entity related to relevant information at operation 1030.

The control unit 150 may control such that the entity text having the relevant information is displayed so as to be distinguished from other texts at operation 1040.

The control unit 150 may detect a user input for selecting the entity text that is displayed distinctly from other texts at operation 1050. In response to the user input for selecting the entity text, the control unit 150 may call relevant information retrieved in association with the entity text and display the relevant information on the screen at operation 1060.

The control unit 150 may detect a user input for selecting the relevant information at operation 1070. In response to the user input for selecting the relevant information, the control unit 150 may add the relevant information linked to the entity text and store the text-based content at operation 1080. The control unit 150 may store the text-based content along with the relevant information in the form of metadata of the entity text.

Figure 11:
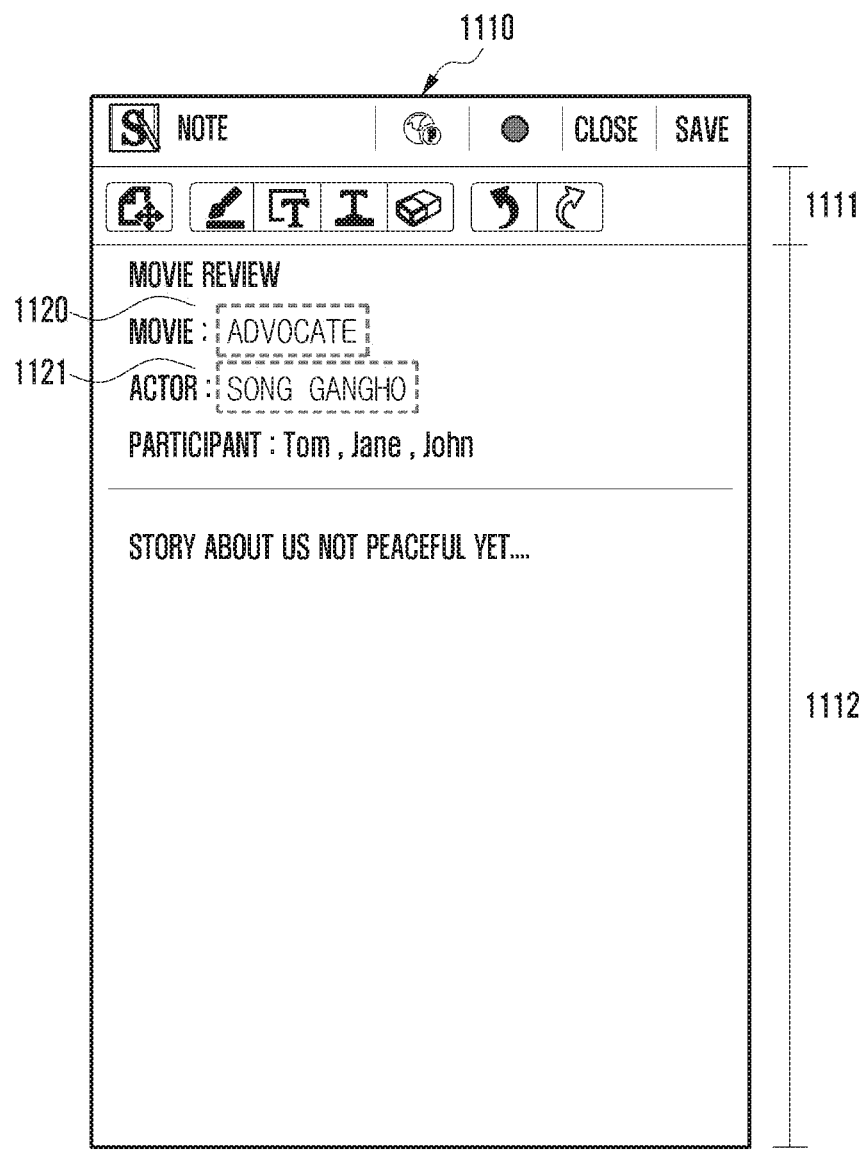
FIG. 11 is a diagram illustrating an exemplary screen display for explaining a text-based content management method according to various embodiments of the present disclosure.
Figure 12:
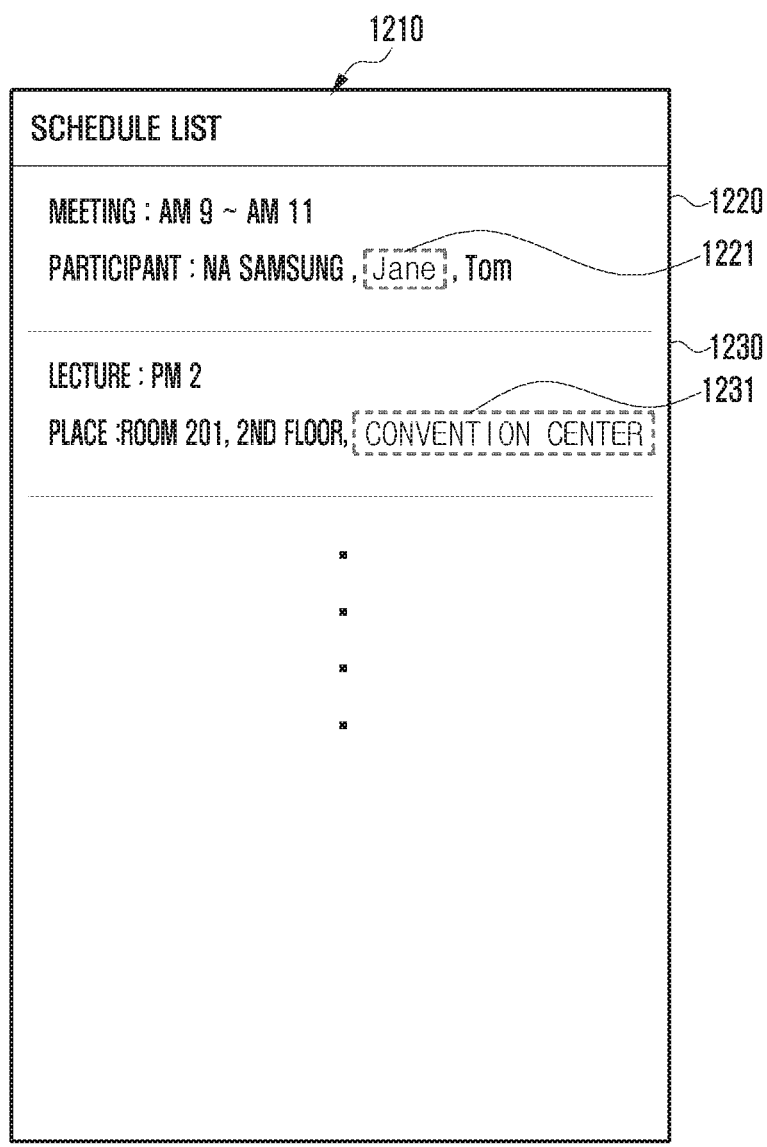
FIG. 12 is a diagram illustrating an exemplary screen display for explaining a text-based content management method according to various embodiments of the present disclosure.

FIGS. 11 and 12 are diagrams illustrating exemplary screen displays for explaining the text-based content management method according to various embodiments of the present disclosure.

Referring to FIGS. 11 and 12, the electronic device (e.g., electronic device 101 of FIG. 1) may manage and store the text input by the user along with the information relevant to the text.

For example, the user may generate and store memos, notes, a diary, and a movie review using the electronic device 101. The user may input text with the memo and note function, store, and call the input text-based contents.

For example, the user may watch a movie and write a movie review. A movie review composition screen 1110 may include a menu region 1111 presenting menu items related to text composition and a display region 1112 for displaying the text input by the user.

The control unit 150 may analyze the text input by the user on the movie review composition screen 1110 to detect entities having relevant information. In a case that there is any relevant information stored in the electronic device of at least one participant who has watched the movie, the control unit 150 may control such that the text of the participant whose electronic device has the relevant information is displayed so as to be distinguished from other texts. Then, if the user selects the phone number of the corresponding participant, the text of the participant may be configured with the phone number in the form of metadata. The user may add or store information relevant to the movie star (e.g., Song Kangho 1121) to the review or store the detailed information on the movie as the relevant information along with the movie title 1120.

If the user calls the stored movie review content, the control unit may control such that the entity text having the linked relevant information is displayed so as to be distinguished from other normal texts. The user may check the text "Advocate" 1120 or the text "Song Gangho" 1121 and call the relevant information stored in association with the text "Advocate" 1120 or the text "Song Gangho" 1121.

For example, in the case of managing schedule with the electronic device, the user may input a text related to a schedule as shown in schedule management screen 1210 of FIG. 12. The control unit 150 may recognize the entity having relevant information in the text input in real time and notify the user of the retrieval of the relevant information by distinguishing (e.g., highlighting, underlining, etc.) the text. The user may be aware of the presence of the relevant information through the highlighted text and, if there is any relevant information to add a schedule, select the relevant information to be added to the schedule management content.

For example, the user may select a participant (e.g., Jane 1221) of a meeting in a first schedule item 1220 on the screen 1210 and add the phone number of the selected participant as relevant information, or select the meeting place in the second schedule item 1230 and add the location information (e.g., convention center 1231) of the place as the relevant information to the schedule management content.

Afterward, the user may call the stored schedule management content. If a user wants to check the meeting place while managing the schedule, the user may select the text "convention center" to easily check the location information, i.e., meeting place, linked to the convention center.

While the present disclosure has been shown and described with reference to various embodiments thereof, it will be understood by those skilled in the art that various changes in form and details may be made therein without departing from the spirit and scope of the present disclosure as defined in the appended claims and their equivalents.

What is claimed is:

1. An electronic device, comprising:
a memory configured to store application data of applications of the electronic device;
a communicator;
a display; and
at least one processor configured to:
  display, via the display, a text input window while executing an application regarding a message service,
  receive, at the electronic device, at least one text input on the text input window, detect, prior to a sending of a message, at least one entity text among the at least one text input on the text input window, the detected at least one entity text distinguished from among the at least one text input, receive a first selection input for selecting an entity text among the at least one entity text, search, based on the first selection input, the application data stored in the memory, display results of the search, the results comprising a list of relevant information corresponding to the selected entity text corresponding to the first selection input, the selected at least one entity text being a search keyword for generating the list of the relevant information, generate, in response to a receiving of a second selection input for selecting a relevant information from the list of the relevant information, a text-based content message including normal text content and metadata, each text input provided within the text input window being configured as normal text and the selected relevant information corresponding to the second selection input is configured as metadata linked to the normal text associated with the selected entity text, send, via the communicator, the text-based content message to an external device, and display, on the display, the text-based content message in a format which displays text corresponding to characters associated with each text input provided within the text input window as normal text and a visual indicator associated with the selected relevant information, wherein the visual indicator associated with the selected relevant information modifies the normal text associated with the selected entity text.

2. The electronic device of claim 1, wherein the at least one processor is further configured to:

search at least one of a content title, metadata, or content body for the relevant information including the at least one entity text, and search the external device interoperating with an application running on the electronic device for the relevant information.

3. The electronic device of claim 1, wherein the at least one entity text is a word representing at least one of an object containing or managing information, a tangible thing, an intangible thing, a person, a place, an event, or a concept.

4. The electronic device of claim 1, wherein the at least one processor is further configured to change, when the at least one entity text is detected, the at least one entity text in at least one of a font, a size, a color, or an effect to be distinguished from other texts.

5. The electronic device of claim 1, wherein the at least one processor is further configured to:

store the text-based content message in the memory.

6. The electronic device of claim 1, wherein the text-based content message includes instructions to:

control a display of the external device to display the text-based content message in a format which displays text corresponding to characters associated with each text input provided within the text input window as normal text and a visual indicator associated with the selected relevant information, the visual indicator associated with the selected relevant information modifying the normal text associated with the selected entity text, display, on the display of the external device, the relevant information linked to the at least one entity text in response to receiving an input associated with the visual indicator associated with the selected relevant information, and execute a function or application corresponding to the relevant information selected in response to the external device receiving an input selecting the relevant information displayed on the display of the external device.

7. A method of an electronic device, the method comprising:

displaying, via a display, a text input window while executing an application regarding a message service;

receiving, at the electronic device, at least one text input on the text input window;

detecting, prior to a sending of a message, at least one entity text among the at least on text input displayed on the text input window, the detected at least one entity text distinguished from among the at least one text input;

receiving a first selection input for selecting an entity text among the at least one entity text, searching, based on the first selection input, application data stored in a memory, displaying results of the searching, the results comprising a list of relevant information corresponding to the selected entity text corresponding to the first selection input, the selected at least one entity text being a search keyword for generating the list of the relevant information;

generating, in response to a receiving of a second selection input for selecting a relevant information from the list of the relevant information, a text-based content message including normal text content and metadata, each text input provided within the text input window being configured as normal text and the selected relevant information corresponding to the second selection input is configured as metadata linked to the normal text associated with the selected entity text;

sending, via a communicator, the text-based content message to an external device; and displaying, at the electronic device, the text-based content message in a format which displays text corresponding to characters associated with each text input provided within the text input window as normal text and a visual indicator associated with the selected relevant information, wherein the visual indicator associated with the selected relevant information modifies the normal text associated with the selected entity text.

8. The method of claim 7, further comprising:

searching for the relevant information including the entity text by searching at least one of a content title, metadata, or content body.

9. The method of claim 8, wherein the searching for the relevant information further comprises:

searching the external device interoperating with an application running on the electronic device for the relevant information.

10. The method of claim 7, wherein the detecting of the entity text comprises detecting a word representing at least one of an object containing or managing information, a tangible thing, an intangible thing, a person, a place, an event, and a concept.

11. The method of claim 7, wherein the detecting the entity text comprises changing, when the entity text is detected, the entity text to be distinguished from other texts.

12. The method of claim 7, further comprising storing the text-based content message at the electronic device.

\* \* \* \* \*